Feb. 28, 1967   H. G. MATHEWS   3,305,986
INSULATED ENCLOSURES AND PANELS THEREFOR
Filed Aug. 7, 1962   2 Sheets-Sheet 1

INVENTOR.
HOWARD G. MATHEWS
BY Dicke & Craig
ATTORNEYS

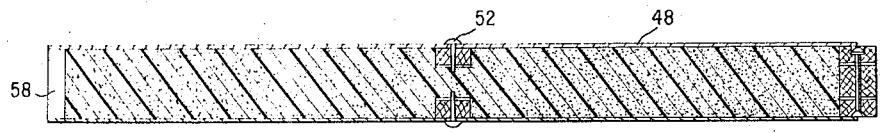
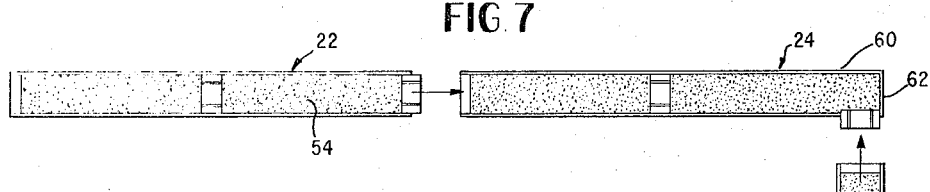
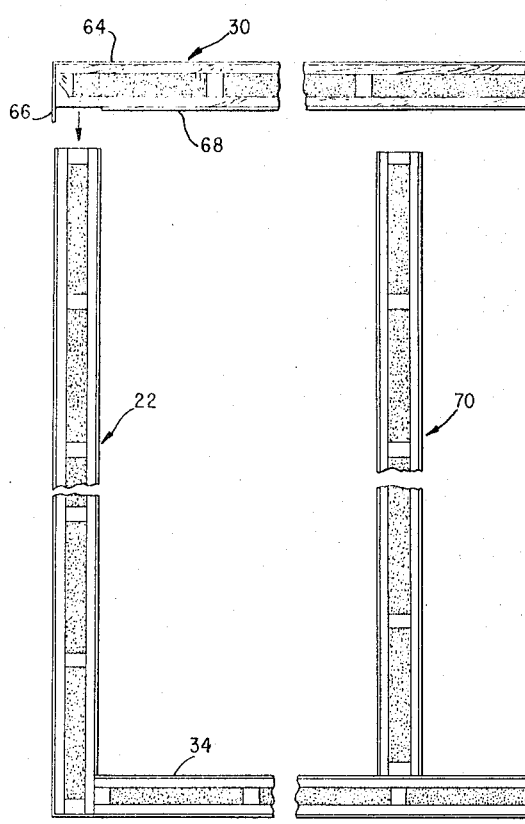
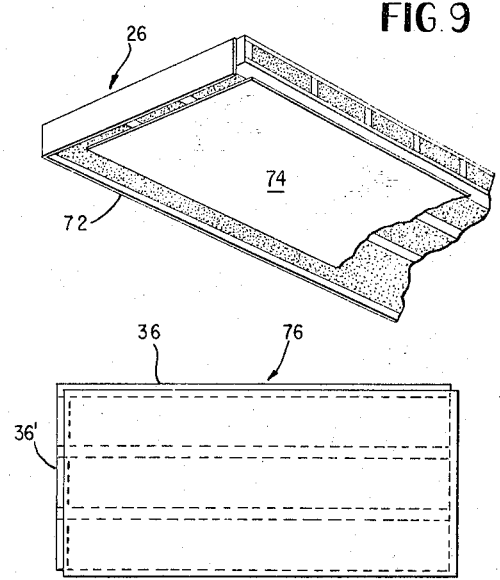

United States Patent Office 3,305,986
Patented Feb. 28, 1967

3,305,986
INSULATED ENCLOSURES AND
PANELS THEREFOR
Howard G. Mathews, Levittown, N.J., assignor to Foam Products Corporation, Thomasville, Ga., a corporation of Georgia
Filed Aug. 7, 1962, Ser. No. 215,366
14 Claims. (Cl. 52—270)

The present invention relates to the manufacture and construction of walk-in type enclosures such as refrigerated enclosures, radio frequency shielding enclosures and the like. More specifically, the present invention relates to improvements in refrigerated enclosures erected from prefabricated panels, and to improvements in the panels and the method of making same.

Panels manufactured in accordance with the present invention include main body portions of low thermal conductivity such as a polyurethane foam core, reinforcing frame members, and suitable cover members. The cover members which may be of metal and the reinforcing frame members which include metallic strips are so arranged that there is no metal to metal contact between the inside and outside of the fabricated enclosure. The panels are provided with cover members which are recessed at one side from the remainder of the panel and at the other side extend outwardly forming integral joint portions which are complementary with joint portions of adjacent panels.

Enclosures fabricated in accordance with the present invention may be assembled in less time with labor savings in the order of 25% to 50% as compared to presently available commercial enclosures. Furthermore, enclosures in accordance with the present invention have better heat insulating characteristics than known enclosures of comparable size.

One of the primary objects of the present invention is to provide improved laminate panels having low thermal conductivity for fabricating enclosures.

Another object of the present invention is to provide panels having integral joint portions enabling the panels to be fabricated into enclosures more economically than when following procedures heretofore available.

Still another object of the present invention is to provide a low cost insulated enclosure combining low thermal conductivity with high strength.

A further object of the present invention is to provide an improved method for manufacturing laminate panels.

A still further object of the present invention is to provide improved laminate panels having at least one metallic cover member and provided with reinforcing frame means wherein there is no metal to metal contact through the panels.

Figure 1:
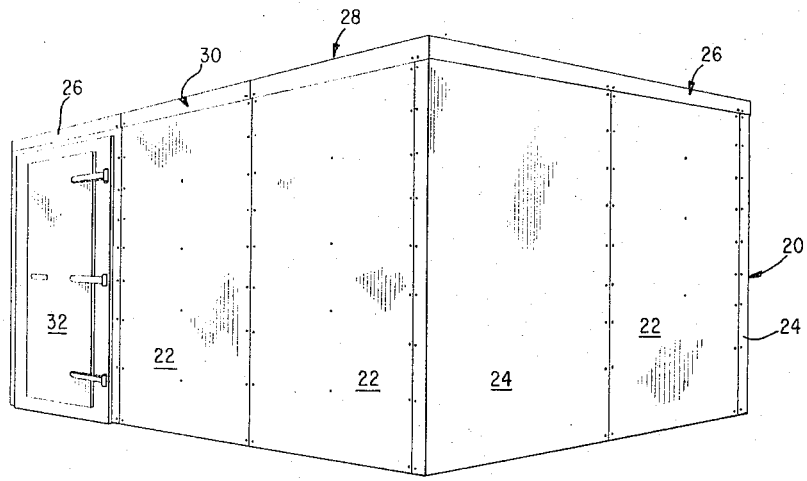
Figure 2:
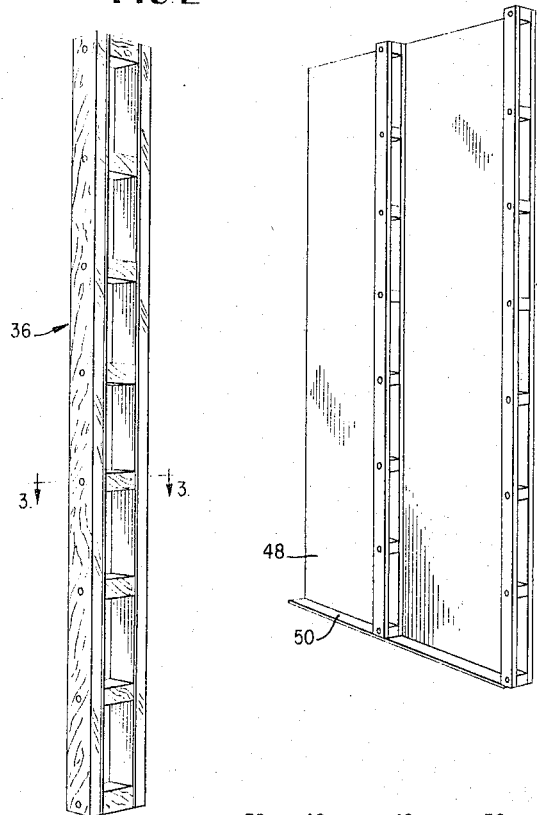
Figures 4, 5:
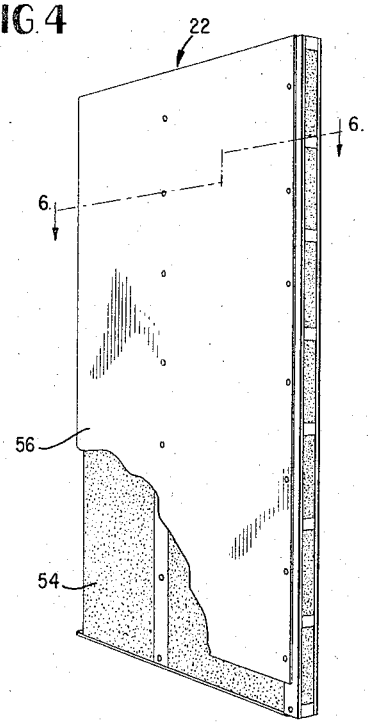
Figure 3:
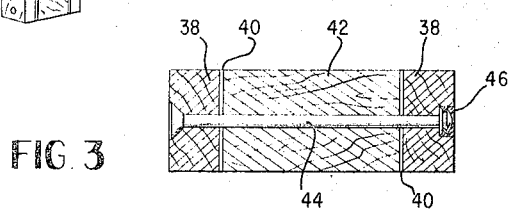

These and other objects, features and advantages of the present invention will become more apparent from the following description and the accompanying drawings wherein:

FIGURE 1 is a perspective view of an enclosure fabricated in accordance with the present invention, FIGURE 2 is a perspective view of a reinforcing frame member, FIGURE 3 is an enlarged cross-sectional view substantially on the line 3—3 of FIGURE 2 showing the arrangement of a securing means extending through the reinforcing frame member, FIGURE 4 is a perspective view illustrating an intermediate step in the manufacture of a typical side wall panel wherein two reinforcing frame members are shown joined to the outer cover member of the panel, FIGURE 5 is a perspective view substantially similar to that of FIGURE 4 showing the panel after the addition of the foam core and the inner cover member, and wherein a portion of the inner cover member is broken away for the sake of clarity, FIGURE 6 is an enlarged cross-sectional view of the typical side wall panel taken on the line 6—6 of FIGURE 5, FIGURE 7 is an exploded partial plan view indicating the manner of assembling the side wall panels to each other, FIGURE 8 is a partial vertical sectional view through an enclosure having an internal partition wherein the roof panel has been elevated to indicate more clearly the manner of assembly, FIGURE 9 is a bottom perspective view of portions of a typical roof panel, and FIGURE 10 is a plan view of a modified roof panel.

Referring now to the drawings, and more particularly to FIGURE 1, reference numeral 20 designates an insulated enclosure for use as a cold storage room, a walk-in cooler or the like. Enclosure 20 includes side wall panels 22, corner wall panels 24, opposite roof corner panels 26 and 28, intermediate roof panels 30, a suitable insulated door 32, and floor panels 34. As will be discussed more fully hereinafter, the respective panels are provided at least at one edge thereof with an interlocking joint portion cooperating with a corresponding joint portion of an adjacent panel.

FIGURES 2 and 3 illustrate a reinforcing frame generally designated by numeral 36 which has universal application to the panels of the subject invention. Frame 36 includes at each side thereof an outer strip 38 of wood or similar non-conductive material and an inner strip 40 of steel or similar metal. The two sides of the frame are spaced from each other in ladder like arrangement by spacing elements 42, and are secured in fixed relationship by a countersunk rivet 44 in each spacing element 42. Each rivet is provided with a washer 46 and is countersunk so that polyurethane foam or other suitable non-conductive material may cover the ends of the rivets so that there is no metal to metal contact through frame 36.

FIGURES 4 to 6 indicate the steps of manufacturing a typical side wall panel 22. Referring now to FIGURE 4, two reinforcing frames 36 are secured in fixed position to an outer cover member 48 of the panel which is preferably zinc coated steel, and which is provided with an inwardly bent edge portion 50. The frames are secured to cover 48 by self-tapping screws 52, which as shown in FIGURE 6, extend through the outer strips 38 and penetrate the metal strips 40 forming a tight seal that will not pull away as might be the case if wood alone was used in frames 36. As illustrated in FIGURE 4, one of frames 36 is secured intermediate the ends of cover 48 while the other frame member is secured along one edge of the cover with a portion thereof projecting beyond cover 48.

The above apparatus is now placed into a suitable mold and a polyurethane foam core is bonded thereto. The quantity of chemicals used to produce the foam as well as the reaction conditions are regulated to produce a core of the requisite size and density wherein the walls between spacer elements 42 of the frame are filled with foam. A suitable form is placed within the mold so that the foam core 54 terminates short of the left longitudinal edge of cover 48 by a distance corresponding to the projection of frame member 36 at the right longitudinal edge thereof as viewed in FIGURE 5. An inner cover 56 is now fastened in position in alignment with the longitudinal edges of the outer cover 48 by means of self-tapping screws 52. In this manner a recessed portion 58 constituting a female joint is provided at one side of panel 22 which is complementary to the projecting part of frame 36 of an adjacent panel. The bottom of inner cover 56 terminates short of bottom edge of the panel to accommodate a floor panel as will become more apparent hereinafter.

The manufacture of a typical side wall corner panel 24 is basically similar to the steps described above in connection with the side wall panel 22 of FIGURES 4 to 6. However, as shown in FIGURE 7, the reinforcing frame 36 constituting the male joint projects perpendicularly to the remainder of the panel. To accommodate this, the outer cover 60 of panel 24 is provided with a transverse extension 62 which is secured to one side of frame 36, and the inner cover 64 is made smaller so as to abut against the other side of frame member 36.

The manner of assembling the fabricated wall panels is apparent from FIGURE 7 which indicates by means of arrows how the interlocking joints of a corner panel 24 and of side wall panels 22 at each side thereof are united. Preferably a rubber based mastic cement is applied to the joints before interlocking to ensure an air and moisture proof seal. When interlocked, the projecting covers forming the female joint of one panel are fastened to the complementary portions of frame member 36 of the adjacent panel by self-tapping screws which project into the metal strips 40 of the frame member 36.

FIGURE 8 shows that the intermediate roof panels 30 include a metallic cover 64 having depending vertical edge portions 66 which upon assembly overlap the upper edge of side wall panels 22. Edge portions 66 are then fastened by self-tapping screws to cover 48 of the side wall panels. The inner roof cover member 68 of panels 30 are recessed as shown in FIGURE 8 a distance corresponding to the thickness of a side wall panel 22.

A floor panel 34 abuts the core and frame members of the side wall panels 22 in the regions not covered by inner cover members 56. In this manner a foam to foam, or wood to foam joint which is non-conductive is achieved. Suitable molding strips (not shown) may be provided as desired at the interior corner of the enclosure. If more than one floor panel 34 is required to extend the width of the enclosure, the panels may be provided with cooperating joint portions of the type described above in connection with adjacent side wall panels.

Reference numeral 70 generally designates an optional interior partition which may be secured between the floor and roof panels in any suitable manner. The construction of partition 70 substantially corresponds to the construction of a side wall panel 22 with the exception that the covers of partitions 70 extend the entire height of the partitions.

FIGURE 9 shows a corner roof panel 26 having along two adjacent edges thereof a downwardly depending outer cover 72 which overlaps the tops of the associated wall panels. An inner cover 74 of panel 26 is recessed around the entire perimeter thereof from the edges of the panel. Adjacent the depending edges of the outer cover 72, inner cover 74 is recessed a distance corresponding to the width of the wall panels. Along the other longitudinal edge, inner cover 74 is recessed from the edge of frame 36 to form a male joint portion. The other end of panel 26 (not shown) is also adapted to fit over a wall panel, assuming that one roof panel extends the width of the enclosure. With larger enclosures, a plurality of roof panels will be joined in a suitable manner such as by the type of joints described above by providing a transverse reinforcing frame. In this case, outer cover 72 will depend at only one end of the panel as well as along one side.

In FIGURE 9 two intermediate reinforcing frames 36 are provided. It will be appreciated that the number of intermediate frames and their spacing may be varied depending upon the overall size of the panel.

In FIGURE 10 there is illustrated a modified roof panel generally designated 76 for use in large enclosures requiring a plurality of panels to span the width of the enclosure. Panel 76 is provided at one side with frame member 36 constituting a male joint portion, and at one end with a smaller frame member 36' also forming a male joint portion. These joints are manufactured in a manner analogous to the joint portions described previously, and at the other end and other side with projecting cover members forming female joints. Any number of panels of this construction could be joined intermediate roof panels such as 26 and 28 of FIGURE 1 to increase the width of the enclosure.

In a specific embodiment of my invention, the side wall panels are 8 feet by 4 feet by 4 inches. The recesses 58 are 1″ in depth, and the core is a rigid polyurethane foam. All exterior covers are 22 gage zinc coated steel, and the interior floor cover is 16 gage steel. The inside covers may be of the same material as the outside covers, however, other material may be utilized in lieu thereof, for example, a reinforced fiberglass panel which may be provided with vertical ribs serving to space the contents of the enclosure from the walls.

It will be appreciated that the above material and dimensions are merely exemplary, and that the present invention is susceptible of many changes and modifications. Accordingly, I intend to encompass all such changes and modifications as fall within the scope of the appended claims.

I claim:

1. An insulated enclosure comprising a plurality of laminate panels, said panels including roof, wall and floor panels, each panel including a foam core bonded to reinforcing frame means and cover means for said core, said cover means including a metallic outer cover, each outer cover extending beyond one edge of the respective core at one side thereof and terminating short of the opposite edge of said core, self tapping screws securing said outer cover to said reinforcing frame means, each panel having an inner cover in alignment with the outer cover thereof with respect to said two edges of the core and cooperating with said outer cover forming joint means complementary to a joint means of an adjacent panel, at least some of said roof panels having outer covers with depending edge portions overlying portions of respective wall panels and secured thereto in a fluid tight manner.

2. An insulated enclosure comprising a plurality of laminate panels, said panels including roof, wall and floor panels, each panel including a foam core bonded to reinforcing frame means and cover means for said core, said reinforcing frame means including two metal strips separated by insulating spacer elements and strips of insulating material overlying the outside surfaces of said metal strips, said cover means including a metallic outer cover, each outer cover extending beyond one edge of the respective core at one side thereof and terminating short of the opposite edge of said core, self tapping screws securing said outer cover to said reinforcing frame means, each panel having an inner cover in alignment with the outer cover thereof with respect to said two edges of the core and cooperating with said outer cover forming joint means complementary to a joint means of an adjacent panel, at least some of said roof panels having outer covers with depending edge portions overlying portions of respective wall panels and secured thereto in a fluid tight manner.

3. An insulated enclosure comprising a plurality of laminate floor, roof and wall panels, each panel including a foam core, an inner cover and an outer cover secured to said core, and reinforcing frame means between said covers, said reinforcing frame means including at least two spaced longitudinal frame members, one of said frame members being positioned intermediate the width of the panel and the other of said frame members being positioned at one edge thereof and extending outwardly a slight distance beyond said covers, in the region of said one edge, said covers at the opposite end of said panel extending beyond said core a distance corresponding to the projection of said frame member whereby integral joints are formed engaging complementary joints of adjacent panels.

4. An insulated enclosure comprising a plurality of laminate floor, roof and wall panels, each panel including a foam core, an inner cover and an outer cover secured to said core, and reinforcing frame means between said covers, said reinforcing frame means including at least two spaced longitudinal frame members, one of said frame members being positioned intermediate the width of the panel and the other of said frame members being positioned at one edge thereof and extending outwardly a slight distance beyond said covers in the region of said one edge, said covers at the opposite end of said panel extending beyond said core a distance corresponding to the projection of said frame member whereby integral joints are formed engaging complementary joints of adjacent panels, each reinforcing frame member including metal elements joined at intervals by insulated spacer elements and insulating means covering the outermost sides of said metal elements.

5. An insulated enclosure comprising a plurality of laminate floor, roof and wall panels, each panel including a foam core, an inner cover and an outer cover secured to said core, and reinforcing means including at least two spaced longitudinal frame members, one of said frame members being positioned intermediate the width of the panel and the other of said frame members being positioned at one edge thereof and extending outwardly a slight distance beyond said covers in the region of said one edge, said covers at the opposite end of said panel extending beyond said core a distance corresponding to the projection of said frame member whereby integral joints are formed engaging complementary joints of adjacent panels, self tapping screws extending through said covers and projecting into said metal elements to secure said covers to said frame members.

6. A laminate panel comprising a polyurethane foam core, an inner cover and an outer cover secured to said core, and reinforcing frame means between said covers, said reinforcing frame means including at least two spaced longitudinal frame members, each of said frame members including metal elements joined at spaced intervals by insulated spacer elements and insulating means covering the outermost ends of said metal elements, one of said frame members being positioned intermediate the width of the panel and the other of said frame members being positioned at one edge of the panel and extending outwardly a slight distance beyond said covers in the region of said one edge, said covers at the opposte edge of said panel extending beyond said core a distance corresponding to the projection of said frame member whereby integral joints are formed adapted to be engaged by complementary joints of adjacent panels.

7. A laminate panel comprising a polyurethane foam core, an inner cover and an outer cover secured to said core, and reinforcing frame means between said covers, said reinforcing frame means including at least two spaced longitudinal frame members, each of said frame members including metal elements joined at spaced intervals by insulated spacer elements and insulating means covering the outermost ends of said metal elements, one of said frame members being positioned intermediate the width of the panel and the other of said frame members being positioned at one edge of the panel and extending outwardly a slight distance beyond said covers in the region of said one edge, said covers at the opposite edge of said panel extending beyond said core a distance corresponding to the projection of said frame member whereby integral joints are formed adapted to be engaged by complementary joints of adjacent panels.

8. A laminate panel comprising a polyurethane foam core, an inner cover and an outer cover secured to said core, and reinforcing means between said covers, said reinforcing frame means including at least two spaced longitudinal frame members, each of said frame members including metal elements joined at spaced intervals by insulated spacer elements, and insulating means covering the outermost ends of said spacer elements, one of said frame members being positioned intermediate the width of the panel and the other of said frame members being positioned at one edge of the panel and extending outwardly a slight distance beyond said covers in the region of said one edge, self tapping screws extending through said covers and projecting into said metal elements to secure said covers to said frame members, said covers at the opposite edge of said panel extending beyond said core a distance corresponding to the projection of said frame member whereby integral joints are formed adapted to be engaged by complementary joints of adjacent panels.

9. A laminate panel comprising a core of low thermal conductivity, an inner cover and an outer cover secured to said core, and reinforcing frame means between said covers, said reinforcing frame means including a longitudinal frame member positioned at one edge of said panel and extending outwardly a slight distance beyond said covers in the region of said one edge, said frame member including metal elements joined at spaced intervals by insulating spacer elements, and insulating means covering the outermost ends of said metal elements, said covers at the opposite edge of said panel extending beyond said core a distance corresponding to the projection of said frame member whereby integral joints are formed adapted to be engaged by complementary joints of adjacent panels.

10. A laminate panel comprising a core of low thermal conductivity, an inner cover and an outer cover secured to said core, and reinforcing frame means between said covers, said reinforcing frame means including a longitudinal frame member, said frame member including a pair of longitudinal metal strips joined at spaced intervals by insulated spacer elements positioned at one edge of said panel and extending outwardly a slight distance beyond said covers in the region of said one edge, said covers at the opposite edge of said panel extending beyond said core a distance corresponding to the projection of said frame member whereby integral joints are formed adapted to be engaged by complementary joints of adjacent panels.

11. A laminate roof panel comprising a rigid foam core, an inner cover and an outer cover secured to said core, and reinforcing frame means between said covers, said reinforcing frame means including a longitudinal frame member, said frame member including metal elements joined at intervals by insulated spacer elements and insulating means covering the outermost sides of said metal elements positioned at one edge thereof and extending outwardly a slight distance beyond said covers in the region of said one edge, said covers at the opposite edge of said panel extending beyond said core a distance corresponding to the projection of said frame member, said outer cover at one end of said panel having a depending edge portion extending below said inner cover, said inner cover terminating short of said one end of said panel.

12. A laminate roof panel comprising a rigid foam core, an inner cover and an outer cover secured to said core, and reinforcing frame means between said covers, and reinforcing means including at least two spaced longitudinal frame members, one of said frame members being positioned intermediate the width of the panel and the other of said frame members being positioned at one edge thereof and extending outwardly a slight distance beyond said covers in the region of said one edge, said covers at the opposite edge of said panel extending beyond said core a distance corresponding to the projection of said frame members, said outer cover at one end of said panel having a depending edge portion extending below said inner cover, said inner cover terminating short of said one end of said panels.

13. A laminate roof panel comprising a rigid foam core, an inner cover and an outer cover secured to said core, and reinforcing frame means between said covers, said reinforcing frame means including at least two spaced longitudinal frame members, one of said frame members being positioned intermediate the width of the panel and the other of said frame members being positioned at one edge thereof and extend outwardly a slight distance beyond said covers in the region of said one edge, said covers at the opposite edge of said panel extending beyond said core a distance corresponding to the projection of said frame member, each frame member including metal elements joined at spaced intervals by insulated space elements and insulating means covering the outermost sides of said metal elements.

14. A laminate corner panel having first and second sides comprising a foam core of low thermal conductivity, an inner cover and an outer cover secured to said core, and reinforcing frame means between said covers, said reinforcing frame means including at least two spaced longitudinal frame members, one of said frame members being positioned intermediate the width of the panel and the other of said frame members being positioned at one of the sides of the panel adjacent one edge of said panel and projecting a slight distance beyond the panel, said covers at the opposite edge of said panel extending beyond said core a distance corresponding to the projection of said frame member.

References Cited by the Examiner

UNITED STATES PATENTS

| | | | |
|---|---|---|---|
| 1,795,716 | 3/1931 | Eckland | 20—92 X |
| 2,243,249 | 5/1941 | Craig | 220—10 X |
| 2,249,590 | 7/1941 | Allen | 20—91 |
| 2,301,657 | 11/1942 | Hlavaty | 220—10 |
| 2,495,862 | 1/1950 | Osborn | 20—4 |
| 2,629,138 | 2/1953 | Hultquist | 20—2 |
| 2,702,412 | 2/1955 | Asch | 20—2 |
| 2,710,430 | 6/1955 | Bailey | 20—4 |
| 2,825,098 | 3/1958 | Hultquist | 20—2 |
| 2,845,152 | 7/1958 | Parent | 189—34 |
| 2,877,508 | 3/1959 | Ewart | 20—4 X |
| 2,915,791 | 12/1959 | Hauf | 189—34 X |
| 3,003,810 | 10/1961 | Kloote et al. | 20—4 |

FOREIGN PATENTS

| | | |
|---|---|---|
| 224,773 | 1959 | Australia. |
| 607,213 | 1948 | Great Britain. |

OTHER REFERENCES

Kloote et al.: Abstract of application Serial No. 191,384, published January 13, 1953, 666 O.G. 603.

FRANK L. ABBOTT, *Primary Examiner.*

JACOB L. NACKENOFF, *Examiner.*

J. E. MURTAGH, *Assistant Examiner.*